US011348045B2

(12) United States Patent
Cameron

(10) Patent No.: US 11,348,045 B2
(45) Date of Patent: *May 31, 2022

(54) CREATING AND UPDATING WORKFORCE SCHEDULES USING A PERSONAL COMMUNICATION SYSTEM

(71) Applicant: Verint Americas Inc., Alpharetta, GA (US)

(72) Inventor: Jeffrey Scott Cameron, San Diego, CA (US)

(73) Assignee: Verint Americas Inc., Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,592

(22) Filed: Nov. 18, 2020

(65) Prior Publication Data

US 2021/0073714 A1   Mar. 11, 2021

Related U.S. Application Data

(63) Continuation of application No. 13/008,283, filed on Jan. 18, 2011, now Pat. No. 10,846,631.

(60) Provisional application No. 61/295,285, filed on Jan. 15, 2010, provisional application No. 61/295,303, filed on Jan. 15, 2010, provisional application No. 61/295,327, filed on Jan. 15, 2010.

(51) Int. Cl.
*G06Q 10/06* (2012.01)

(52) U.S. Cl.
CPC .......................... *G06Q 10/063116* (2013.01)

(58) Field of Classification Search
CPC ............................................. G06Q 10/063116
See application file for complete search history.

(56) References Cited

U.S. PATENT DOCUMENTS

| 6,587,831 | B1 | 7/2003 | O'Brien |
| 6,970,829 | B1 | 11/2005 | Leamon |
| 7,283,971 | B1 | 10/2007 | Levine |
| 8,190,463 | B2 | 5/2012 | Levine |
| 2003/0018509 | A1 | 1/2003 | Ossip |

(Continued)

OTHER PUBLICATIONS

Kursave, Jeffrey D; The necessity of project schedule updating/monitoring/statusing; Cost Engineering; Jul. 2003; 45, 7; ProQuest p. 8 (Year: 2003).

(Continued)

*Primary Examiner* — Andre D Boyce
(74) *Attorney, Agent, or Firm* — Christopher M. Scherer; DeWitt LLP

(57) ABSTRACT

A personal communication system generates a request for initial schedule information corresponding to an initial workforce schedule generated by an enterprise analysis system. The personal communication system transmits the request for initial schedule information to the enterprise analysis system and receives a response including the initial schedule information. The personal communication system then generates a view of the initial workforce schedule based on the initial schedule information and displays the view of the initial workforce schedule in a primary application running on the personal communication system. The personal communication system then monitors for schedule factors relevant to the initial workforce schedule and transmits the schedule factors for use by the enterprise analysis system in generating an updated workforce schedule.

20 Claims, 10 Drawing Sheets

(56) References Cited

U.S. PATENT DOCUMENTS

| | | |
|---|---|---|
| 2005/0004828 A1 | 1/2005 | DeSilva |
| 2007/0250370 A1 | 10/2007 | Partridge |
| 2008/0091501 A1 | 4/2008 | Tewari |
| 2010/0058196 A1 | 3/2010 | Krishnan |
| 2010/0121672 A1 | 5/2010 | Kohler |

OTHER PUBLICATIONS

Sameer Kumar et al; Efficient workforce scheduling for a serial processing environment: a case study at Minneapolis Star Tribune; Omega, Int. J. Mgmt. Sci. 27 (1999) 115-127 (Year: 1999).

CREATING AND UPDATING WORKFORCE SCHEDULES USING A PERSONAL COMMUNICATION SYSTEM

RELATED APPLICATIONS

This application is a continuation of U.S. application Ser. No. 13/008,283, filed on Jan. 18, 2011, which application issued as U.S. Pat. No. 10,846,631, on Nov. 24, 2020, and is related to and claims priority to U.S. Provisional Patent Application No. 61/295,285 entitled "Systems and Methods For Integrating a Workflow Management System with a Social Network," filed on Jan. 15, 2010, U.S. Provisional Patent Application No. 61/295,303 entitled "Systems and Methods for Integrating a workflows management system with a smart phone," filed on Jan. 15, 2010, and U.S. Provisional Patent Application No. 61/295,327 entitled "Systems and Methods for Operating a workflows management system," filed on Jan. 15, 2010, all of which are hereby incorporated by reference in their entirety.

BACKGROUND

Scheduling and calendar systems are widely available. Such systems are often used to create and display appointments and events, organize and display meetings, and create and view group schedules. A variety of calendar and event management systems exist to perform these functions. For instance, schedule and calendar management systems such as web based calendars store meetings and appointments.

Social network services often consist of a representation of various users (often called user profiles), his/her social links, and a variety of additional services. Most social network services are web based and provide various ways for users to interact over the internet, such as e-mail and instant messaging services.

Advanced mobile devices or smart phones are mobile phones offering advanced capabilities, often with PC-like functionality (PC-mobile handset convergence). Some smart phones run complete operating system software providing a standardized interface and platform for application developers. Other smart phones simply provide phone with advanced features like e-mail, Internet and e-book reader capabilities, and/or a built-in full keyboard or external USB keyboard and VGA connector.

Overview

In an embodiment, a personal communication system generates a request for initial schedule information corresponding to an initial workforce schedule generated by an enterprise analysis system. The personal communication system transmits the request for initial schedule information to the enterprise analysis system and receives a response including the initial schedule information. The personal communication system then generates a view of the initial workforce schedule based on the initial schedule information and displays the view of the initial workforce schedule in a primary application running on the personal communication system. The personal communication system then monitors for schedule factors relevant to the initial workforce schedule and transmits the schedule factors for use by the enterprise analysis system in generating an updated workforce schedule.

In another embodiment, the enterprise analysis system comprises one or more of a workforce management system, a workforce optimization system, a learning system, a human resources system, and a calendar management system.

In another embodiment, the personal communication system comprises a wireless communication device.

In another embodiment, the personal communication system comprises a remote web service.

In another embodiment, the remote web service comprises a social networking website and monitoring the personal communication system for schedule factors relevant to the initial workforce schedule comprises examining accessible areas of one or more user profiles for personal information that could be used to modify or change the initial workforce schedule.

In another embodiment, the primary application comprises a web browser.

In another embodiment, the personal communication system receives the updated workforce schedule from the enterprise analysis system and displays a view of the updated workforce schedule in the primary application.

In another embodiment, the initial workforce schedule indicates scheduling availability for one or more users and the schedule factors indicate an update to the scheduling availability for the one or more users.

In another embodiment, the schedule factors indicate a request to change the initial workforce schedule.

In another embodiment, the request to change the initial workforce schedule comprises a request to swap a shift between users of the initial workforce schedule.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
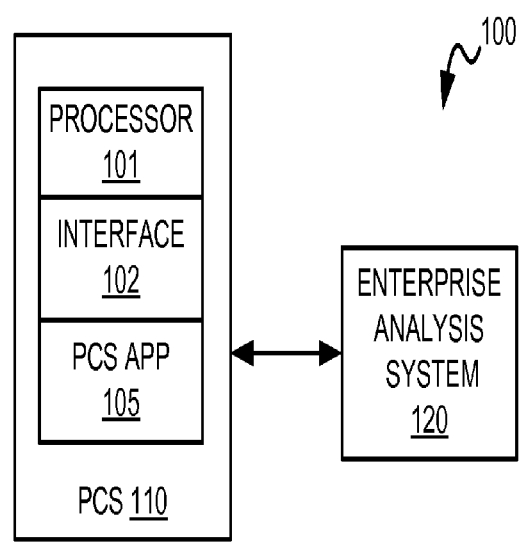
FIG. 1 illustrates an enterprise analysis environment.

FIG. 1 illustrates enterprise analysis environment 100. Enterprise analysis environment 100 includes a personal communication system (PCS) 110 and an enterprise analysis system 120. PCS 110 includes processor 101, interface 102, and PCS application 105.

PCS 110 may be any computer system, custom hardware, or other device configured to request and receive schedule information from enterprise analysis system 120 and display a view of that schedule information in a primary application. Moreover, when executed by processor 101, PCS application 105 can monitor and identify personal schedule information that is accessible by PCS 110. PCS 110 provides schedule factors indicating this personal schedule information to enterprise analysis system 120.

The personal schedule information may be any personal information including items used to create and display appointments and other happenings. The personal information may be in a number of formats. For instance, personal information may be accessed from web-accessible calendar management systems such as, for example, Google, Hotmail, and Yahoo web based calendars. Similarly, personal information may be accessed from social networking services such as, for example, Facebook, Twitter, MySpace, LinkedIn, and Friendster. Additionally, personal information may be access from third party servers in communication with the social networking services.

Enterprise analysis system 120 may be any computer system, custom hardware, or other device configured to create and update a schedule of information. Enterprise analysis system 120 may include a scorecards system, a learning system, and/or a workforce management system. Among other functions, the scorecards system provides for the tracking of a number of key performance indicators for each one of the number of agents such as, for example, in a call center. The scorecards system is a performance management system that maintains "scores" that indicate a measure of performance of personnel, for example, in a call center. The scorecards system may also perform other tasks and functions beyond those discussed herein.

The workforce management system performs tasks such as, for example, scheduling of tasks and training for agents, publishing schedules including training to agents, tracking of adherence of agents to schedules, reporting adherence of agents to schedules to supervisors, and many other functions not pertinent to the discussion herein. The workforce management system may also perform other tasks such as, for example, tracking agent performance, scheduling of tasks and training for agents, publishing schedules including training to agents, tracking of adherence of agents to schedules, reporting adherence of agents to schedules to supervisors, and many other functions not pertinent to the discussion herein.

PCS 110 and enterprise analysis system 120 are connected via links that may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, or any other communication protocols and formats, including combinations thereof.

In operation, processor 101 retrieves and executes PCS application 105. When executed by processor 101, PCS application 105 directs processor 101 to create and update a workforce schedule. In particular, processor 101 first generates a request for initial schedule information corresponding to an initial workforce schedule generated by an enterprise analysis system. Processor 101 then directs the interface 102 to transmit the request for initial schedule information to the enterprise analysis system.

Once a response from the enterprise analysis system including the initial schedule information is received, processor 101 then generates a view of the initial workforce schedule based on the initial schedule information. The view of the initial workforce schedule is then displayed in a primary application running on the personal communication system. In one example, the primary application comprises a web browser or other application running on a wireless communication device. In other examples, the primary application comprises an application running on a remote web service. For example, the view of the initial workforce schedule may be displayed in a Facebook application running on a Facebook server.

Processor 101 then monitors personal communication system 110 for schedule factors relevant to the initial workforce schedule. Monitoring could be done in a variety of ways. In one example, processor 101 may be a local processor that performs the monitoring of personal communication system 110. In other examples, processor 101 may be a remote processor that performs the monitoring of personal communication system 110. Alternatively or additionally, processor 101 may be distributed among a local and remote processor. In this case, the remote processor may direct the monitoring function using the local processor as a proxy.

Relevant schedule factors may include requests, personal information, or other information gathered by processor 101. Processor 101 subsequently transmits the schedule factors for use by the enterprise analysis system to generate an updated schedule.

Figure 2:
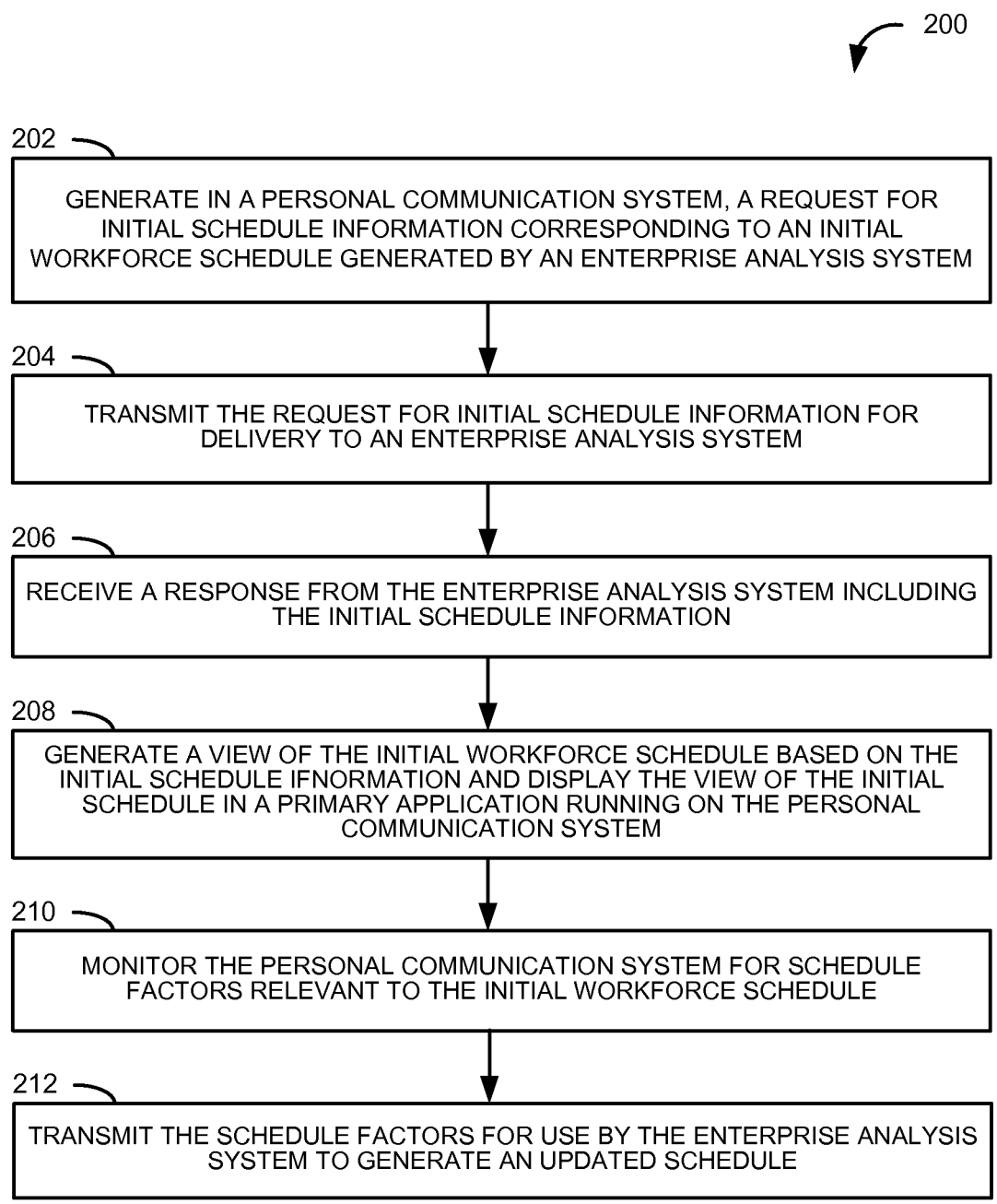
FIG. 2 illustrates operation of a personal communication system in an enterprise analysis environment.

FIG. 2 illustrates operation of PCS application 105 running on PCS 110 in enterprise analysis environment 100. To begin, PCS application 105 directs PCS 110 to generate a request for initial schedule information that corresponds to an initial workforce schedule generated by an enterprise analysis system (Step 202). PCS application 105 then directs PCS 110 to transmit the request for initial schedule information to the enterprise analysis system (Step 204). Shortly, thereafter PCS 110 receives a response from the enterprise analysis system including the initial schedule information (Step 206).

After receiving the response, PCS application 105 directs PCS 110 to generate a view of the initial workforce schedule based on the initial schedule information and display the view of the initial workforce schedule in a primary application running on PCS 110 (Step 208). The primary application may be, for example, a web browser or other application capable of running on PCS 110. PCS application 105 then monitors PCS 110 for schedule factors relevant to the initial workforce schedule (Step 210). Lastly, PCS application 105 transmits the schedule factors for use by enterprise analysis system 120 to generate an updated schedule (Step 212).

Figure 3:
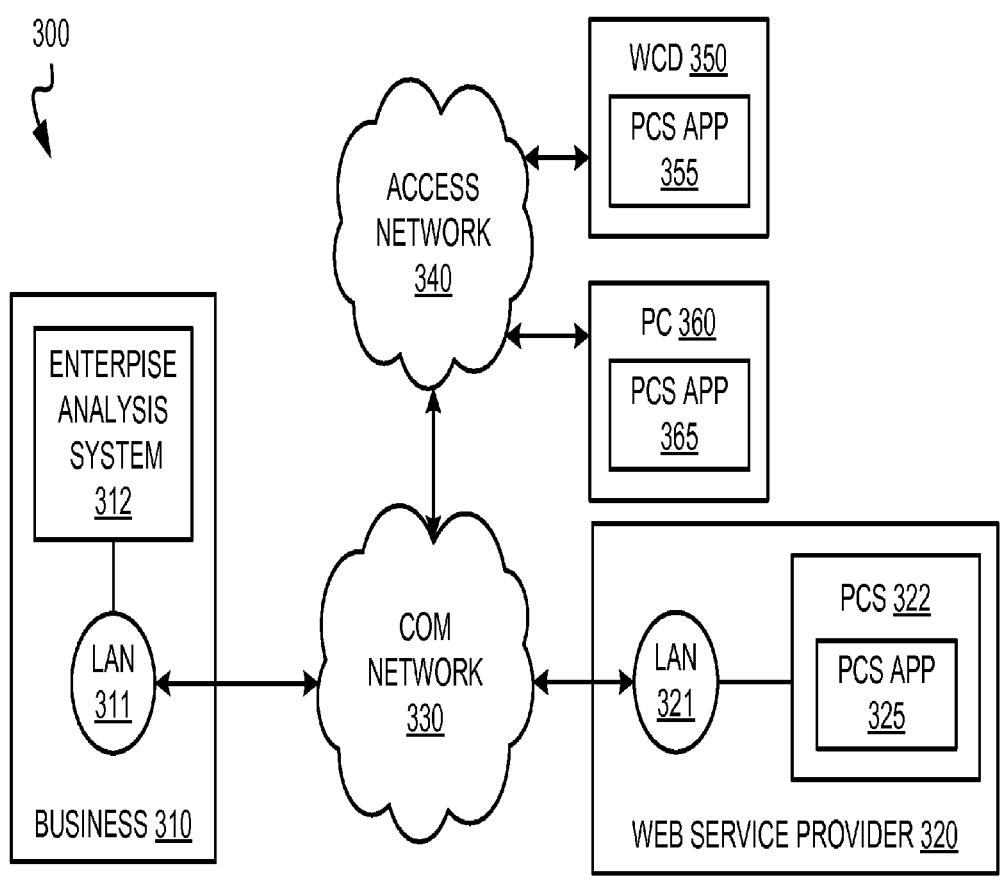
FIG. 3 illustrates an enterprise analysis environment.

FIG. 3 illustrates enterprise analysis environment 300. Enterprise analysis environment 300 includes business 310, web service provider 320, communication network 330, access network 340, wireless communication device 350, and personal computer 360.

Access network 140 and local area networks (LANs) 111 and 121 are connected to communication network 130 via links that may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, or any other communication protocols and formats, including combinations thereof. WCD 350 and PC 360 are connected to access network 340 using similar links.

Business 310 includes local area network (LAN) 311 and enterprise analysis system 312. Business 310 may comprise any business enterprise that includes an enterprise analysis system 312. Enterprise analysis system 312 may be any computer system, custom hardware, or other device configured to create and update a schedule of information. Enterprise analysis system 312 may include a scorecards system, a learning system, a workforce management system, and/or other workforce optimization systems.

The scorecards system provides for the tracking of a number of key performance indicators for each one of a number of agents such as, for example, in a call center. The scorecards system is a performance management system that maintains "scores" that indicate a measure of performance of personnel, for example, in a call center. The scorecards system may also perform other tasks and functions beyond those discussed herein.

The workforce management system performs tasks such as, for example, scheduling of tasks and training for agents, publishing schedules including training to agents, tracking of adherence of agents to schedules, reporting adherence of agents to schedules to supervisors, and many other functions not pertinent to the discussion herein. Additionally, the workforce management system may also perform other tasks such as, for example, tracking agent performance, scheduling of tasks and training for agents, publishing schedules including training to agents, tracking of adherence of agents to schedules, reporting adherence of agents to schedules to supervisors, and many other functions not pertinent to the discussion herein.

Web service provider 320 includes LAN 321 and PCS 322. Web service provider 320 may comprise, for example, a social networking service such as Facebook, Twitter, MySpace, LinkedIn, or Friendster. Alternatively or additionally, web service provider may comprise a web-based calendar such as Google Calendar, Yahoo Calendar, or Hotmail Calendar.

PCS 322 includes PCS application 325. PCS 122 is configured to receive schedule information from enterprise analysis system 312 and display that schedule information in another view. When executed by PCS 322, PCS application 325 requests initial schedule information corresponding to the initial workforce schedule generated by enterprise analysis system 112. Moreover, when executed, PCS application 325 can monitor for and identify personal schedule information on PCS 322 relevant to the initial workforce schedule. In some examples, PCS 322 may include or access any or all of the functions of enterprise analysis system 312.

Moreover, in some examples PCS 322 may include a processor that may be distributed among multiple processing devices. For example, the processor may reside on a third party server (not shown). In this case, in order to monitor the personal communication system for schedule factors relevant to the initial workforce schedule, the processor examines accessible areas of one or more users profiles on the third party server and/or PCS 322 for personal information that could be used to modify or change the initial workforce schedule.

The personal schedule information may be any personal information including items used to create and display appointments and other happenings. The personal information may be in a number of formats. For instance, personal information may be accessed from web-accessible calendar management systems such as, for example, Google, Hotmail, and Yahoo web based calendars. Similarly, personal information may be accessed from social networking services such as, for example, as Facebook, Twitter, MySpace, LinkedIn, and Friendster. In this case, the personal information may be text messages, status updates, and/or other accessible information. Those skilled in the art will appreciate that the personal schedule information may be contained within PCS 322 or distributed among various devices or systems.

In some examples, PCS 322 comprises a web server such as, for example, a Facebook web server. In this case, PCS application 325 monitors the Facebook server and identifies accessible personal schedule information. The personal schedule information may be included in a number of profiles which are configured to share some or all of the information contained therein with PCS application 325. Once obtained, PCS 110 provides schedule factors indicating the personal schedule information to enterprise analysis system 120.

Wireless communication device 350 includes PCS application 355. Wireless communication device may comprise, for example, a mobile telephone or smart phone capable of running PCS application 355. When executed by wireless communication device 350, PCS application 355 requests initial schedule information corresponding to the initial workforce schedule generated by enterprise analysis system 312. Moreover, when executed, PCS application 355 can monitor for and identify personal schedule information on wireless communication device 350. For example, PCS application 355 can identify personal information in text messages, global positioning system (GPS) data, and/or calendar management system data.

In one example of operation, PCS application 355 displays an initial workforce schedule generated by enterprise analysis system 312 in a primary application such as, for example, an internet browser. A user operating PCS 350 may then make a request to change or modify the initial workforce schedule. For example, the request may comprise a request to swap shifts with another user or a request to change the user's availability to be schedule for work.

Personal computer 160 includes PCS application 165. PC 160 may comprise any computer system, custom hardware, or other personal computing device configured to run PCS application 365 in order to create and update a schedule of information. When executed by PC 360, PCS application 365 requests initial schedule information corresponding to the initial workforce schedule generated by enterprise analysis system 312. PCS application 365 can then monitor for and identify personal schedule information on PC 360. For example, PCS application 365 can identify personal information in calendar management systems such as Outlook, or any other PC applications.

Figure 4:
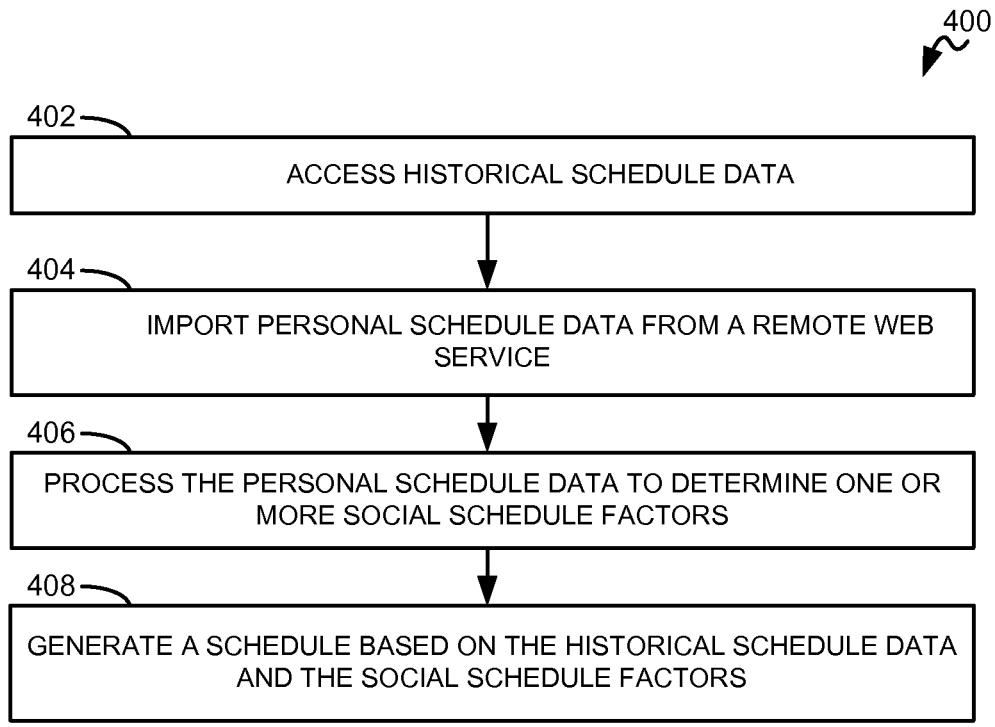
FIG. 4 illustrates operation of an enterprise analysis system in an enterprise analysis environment.

FIG. 4 illustrates operation of enterprise analysis system 312 in an enterprise analysis environment 300 according to an example of operation. In this example, enterprise analysis system 312 may be configured to allow users to remotely access and manage their own schedules. Enterprise analysis system users may include employees, management, and/or any other person or entity for which enterprise analysis system 312 creates and/or updates a schedule.

Enterprise analysis system 312 accesses historical schedule data from an enterprise analysis system database (step 402). The historical schedule data may include, for example, data from monitored systems, data previously imputed by an enterprise analysis system user, and/or reoccurring historic personal schedule data for users that was previously imported (e.g., system user birthdays).

Enterprise analysis system 312 then imports personal schedule data from web service provider 320, wireless communication 350, and/or PC 360 (step 404). As discussed above, a web service provider may be a social networking service such as Facebook, Twitter, MySpace, LinkedIn, or Friendster. A web service provider may also be a web-based calendar system such as Google Calendar, Yahoo Calendar, or Hotmail Calendar. In one embodiment, importing personal schedule data from web service provider 320 may include querying PCS 322 with appropriate authentication and approval for an enterprise analysis system user or group of users and receiving a response including the personal schedule data.

Enterprise analysis system 312 may obtain the appropriate authentication and approval for accessing personal information in various ways. In one embodiment, enterprise analysis system 312 may be pre-configured by enterprise analysis system users with the appropriate username and password combination. In other embodiments, enterprise analysis system 312 may monitor displayed, posted, or broadcasted personal schedule data using the social networking service.

As discussed, an enterprise system user may provide authentication and approval for accessing personal schedule information. The enterprise analysis system user may provide this information via a web browser interface. For example, an enterprise analysis system user operating PC 360 may access enterprise analysis system 312 via a web browser and provide the required authentication and authorization information. Alternatively, the required authentication and authorization can be provided to enterprise analysis system 312 directly.

Enterprise analysis system 312 may also be configured to import personal schedule data from calendar systems that may be periodically web-accessible such as Outlook. For example, enterprise analysis system 312 may access personal schedule data from Outlook calendar systems or other calendar systems and programs running on PC 360 and WCD 350.

Once the personal schedule data has been obtained, enterprise analysis system 312 processes the personal schedule data to determine one or more social schedule factors (step 406). Social schedule factors may indicate a time or times that the enterprise analysis system user is likely unavailable due to a prior personal scheduling. For example, an enterprise analysis system user may indicate on his/her Facebook page that he/she plans to attend an upcoming concert on specified date at a specified time. Enterprise analysis system 312 then generates a schedule based on the historical schedule data and the social schedule factors (step 408).

Figure 5:
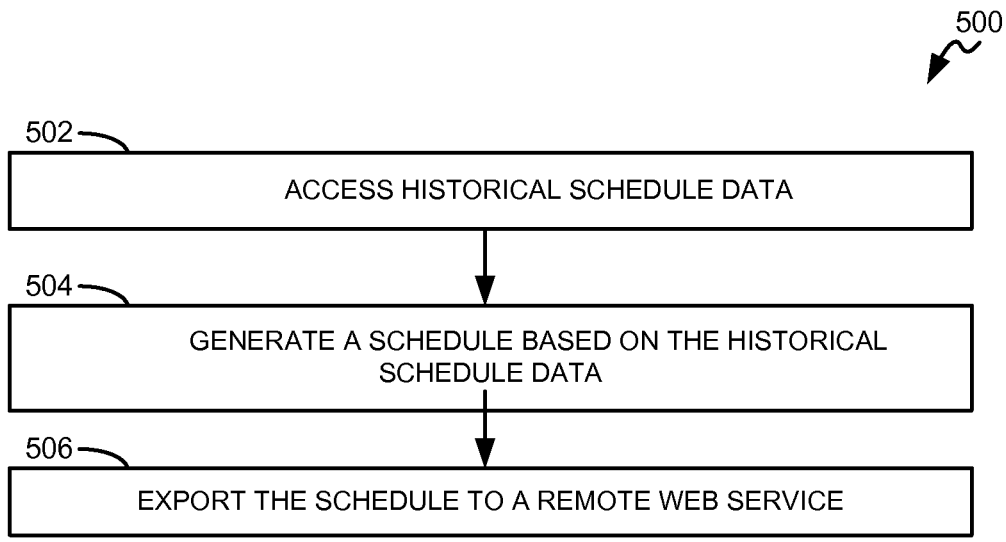
FIG. 5 illustrates operation of an enterprise analysis system in an enterprise analysis environment.

FIG. 5 illustrates operation of enterprise analysis system 312 in an enterprise analysis environment 300 according to another example of operation. In this example, enterprise analysis system 312 accesses historical schedule data from an enterprise analysis database (step 502). Enterprise analysis system 312 then generates a schedule based on the historical schedule data (step 504).

Once a schedule has been generated, enterprise analysis system 312 exports the schedule to web service provider 320 (step 506). Exporting the schedule to web service provider 320 includes exporting the appropriate authentication and approval for a enterprise analysis system user or group of users. Web service provider 320 provides the authentication and approval information to PCS 322. Web service provider 320 may then notify the appropriate user of the exported schedule. Based on the configuration settings, web service provider 320 may post the schedule on the appropriate user web service profile, email the appropriate user or users, or otherwise notify the appropriate user or users of the exported schedule.

Figure 6:
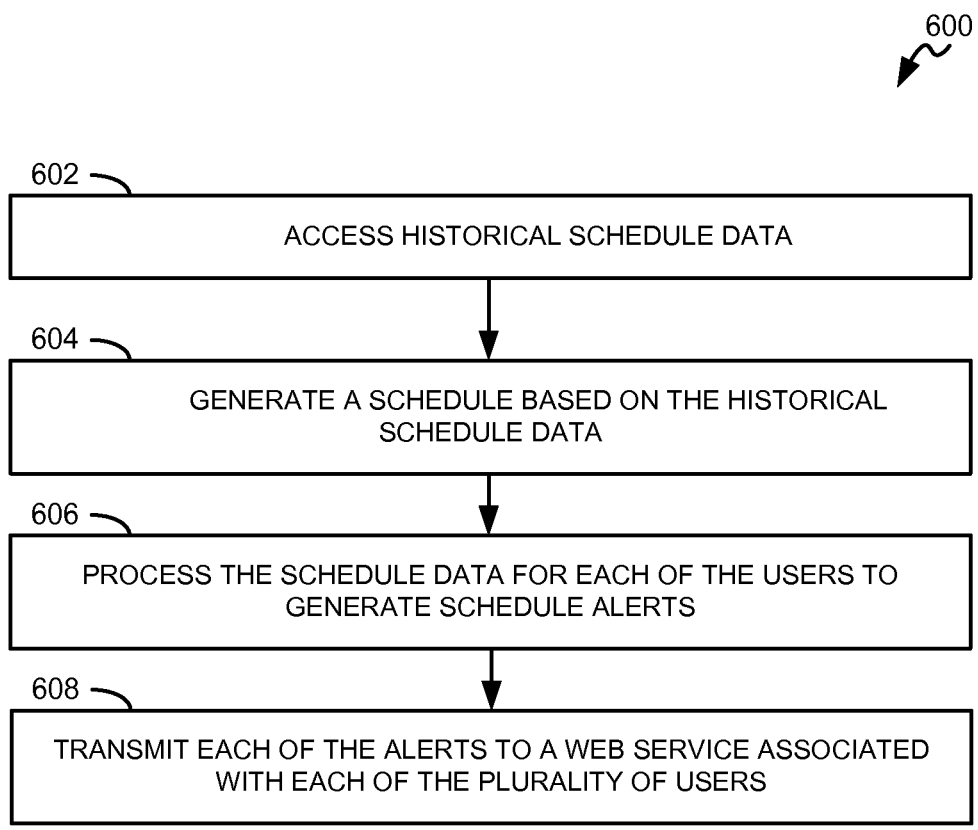
FIG. 6 illustrates operation of an enterprise analysis system in an enterprise analysis environment.

FIG. 6 illustrates operation of enterprise analysis system 312 in an enterprise analysis environment 300 according to another example of operation. In this example, enterprise analysis system 312 accesses historical schedule data from enterprise analysis database (step 602). Enterprise analysis system 312 then generates a schedule based on the historical schedule data (step 604).

Once the personal schedule data has been obtained, enterprise analysis system 312 processes the personal schedule data for numerous enterprise analysis system users and generates schedule alerts the enterprise analysis system users (step 606). Schedule alerts may indicate any number of schedule changes for particular users or groups of users. For example, a schedule alert may indicate a change in a scheduled shift for a particular enterprise analysis system user.

When a schedule alert is received, web service provider 320 may notify PCS 322 and web service provider 320 may then notify the appropriate user of the schedule alert. Based on the configuration settings, web service provider 320 may post the alert on the appropriate user web service profile, email the appropriate user or users, or otherwise notify the appropriate user or users of the exported schedule.

Figure 7A:
FIGS. 7A and 7B illustrate views of a workforce schedule.
Figure 7B:

FIGS. 7A and 7B illustrate a view of an initial workforce schedule and a view of an updated workforce schedule, respectively. For example the view of the initial workforce schedule and the updated workforce schedule may be the view as seen from a user operating WCD 350 or PC 360. As shown, the initial workforce schedule and the updated workforce schedule include shift 1 comprising the time period from 8 AM to 5 PM and a partial view of shift 2. In this example, a shift swap request is received and accepted by enterprise analysis system resulting in the updated workforce schedule illustrated in FIG. 7B.

Figure 8:
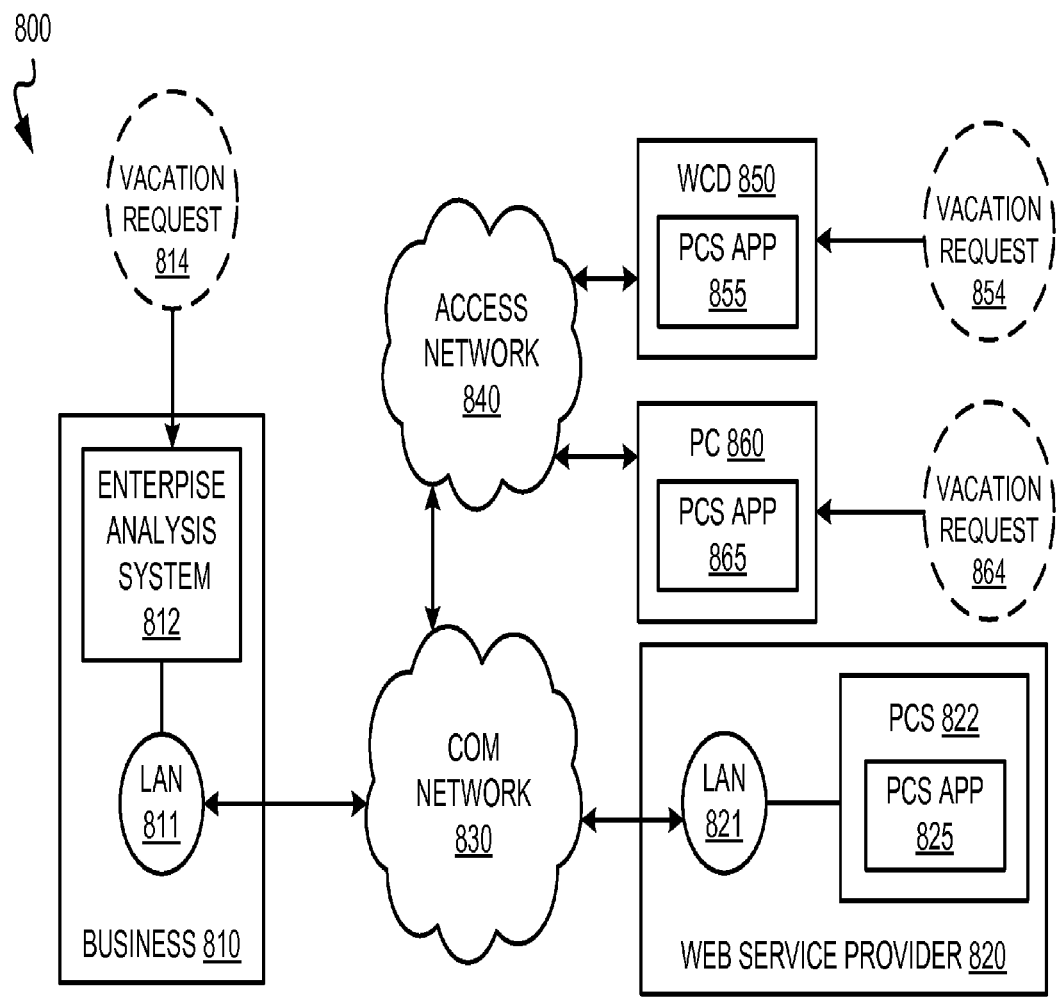
FIG. 8 illustrates an enterprise analysis environment.

FIG. 8 illustrates enterprise analysis environment 800. In this example, enterprise analysis environment 800 includes the elements and functionality of the enterprise analysis system 300 including vacation request 814, vacation request 854, and vacation request 864. In this example, enterprise analysis system 812 is configured to create and update a schedule of information.

In this example, enterprise analysis system 812 may be any computer system, custom hardware, or other device configured to create and update a schedule of information. Enterprise analysis system 812 is configured to receive requests directly and over communication network 850. For example, enterprise analysis system 812 receives vacation request 864 from a user of PC 860 and vacation request 854 from wireless communication device 850.

Enterprise analysis system 812 is configured to receive requests 114 and 115 and provide one or more scheduling suggestions. The requests may be, for example, scheduling or vacation requests. The requests may require management approval. Enterprise analysis system 812 is also configured to process a work-load forecast and determine when multiple overlapping requests are allowed. For example, in some embodiments, enterprise analysis system 812 may provide a enterprise analysis system user with a scheduling suggestion indicating that overlapping requests are allowed. In other embodiments, enterprise analysis system 812 may determine that overlapping requests are not allowed and notify the requestor—possibly via a scheduling suggestion.

The connections or links may use any of a variety of communication media, such as air, metal, optical fiber, or any other signal propagation path, including combinations thereof. Also, the links may use any of a variety of communication protocols, such as internet, telephony, optical networking, wireless communication, wireless fidelity, or any other communication protocols and formats, including combinations thereof.

Figure 9:
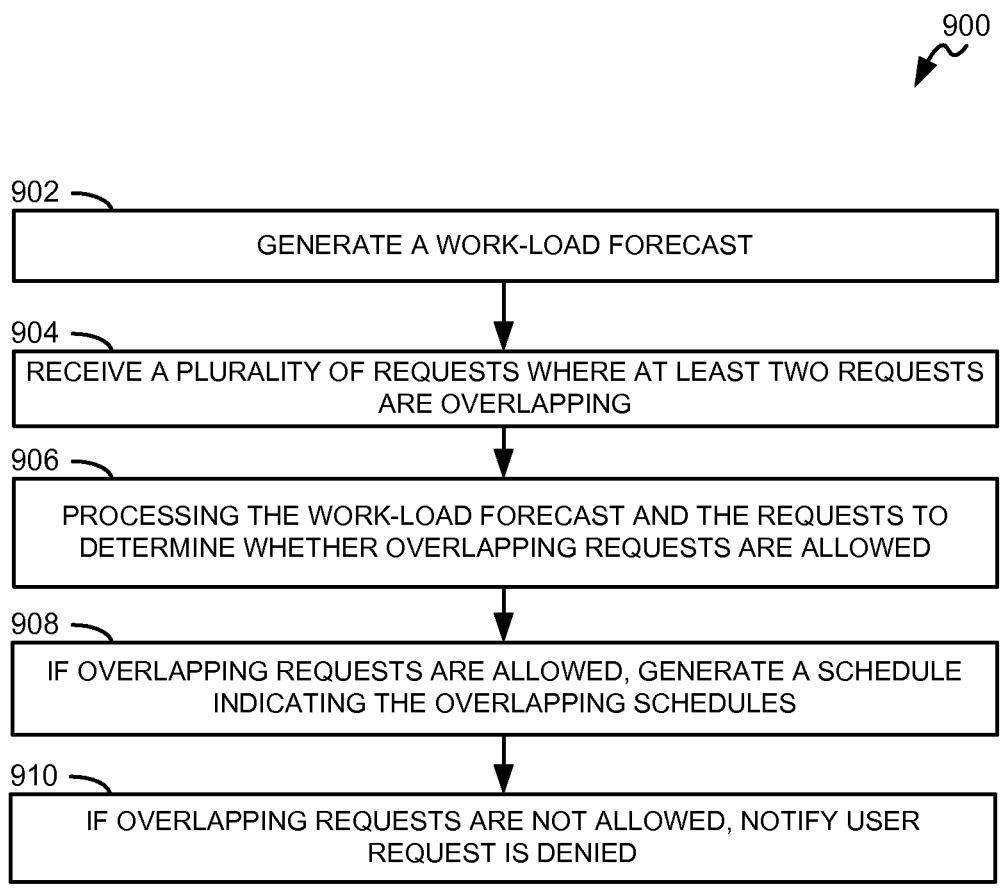
FIG. 9 illustrates operation of an enterprise analysis system in an enterprise analysis environment.

FIG. 9 illustrates operation of an enterprise analysis system 812 in enterprise analysis environment 800. To begin, enterprise analysis system 812 generates a work-load forecast (step 802). For example, enterprise analysis system 812 may generate a work-load forecast in order to estimate future work and organize personnel. Enterprise analysis system 812 receives a plurality of overlapping requests (step 804). Overlapping requests may occur, for example, if the requests occur during the same period of time. For example, two vacation requests may be received where one or more days or shifts overlaps, and thus, the vacation requests themselves overlap.

Enterprise analysis system 812 processes the work-load forecast and the requests to determine whether overlapping requests are allowed (step 806). For example, enterprise analysis system 812 may process the work-load forecast and the vacation requests and determine based on the work-load forecast that the overlapping vacation requests are allowable. The vacation requests may be allowable, for example, if the work-load forecast indicates that business operations can continue without disruption.

If overlapping requests are allowable, enterprise analysis system 812 generates a schedule indicating the overlapping schedules (step 808). For example, if enterprise analysis system 812 allows overlapping requests then enterprise analysis system 812 generates a schedule indicating that the overlapping vacation requests are allowable. However, if the overlapping requests are not allowable, enterprise analysis system 812 may notify a requestor that his/her request is denied (step 810).

Figure 10:
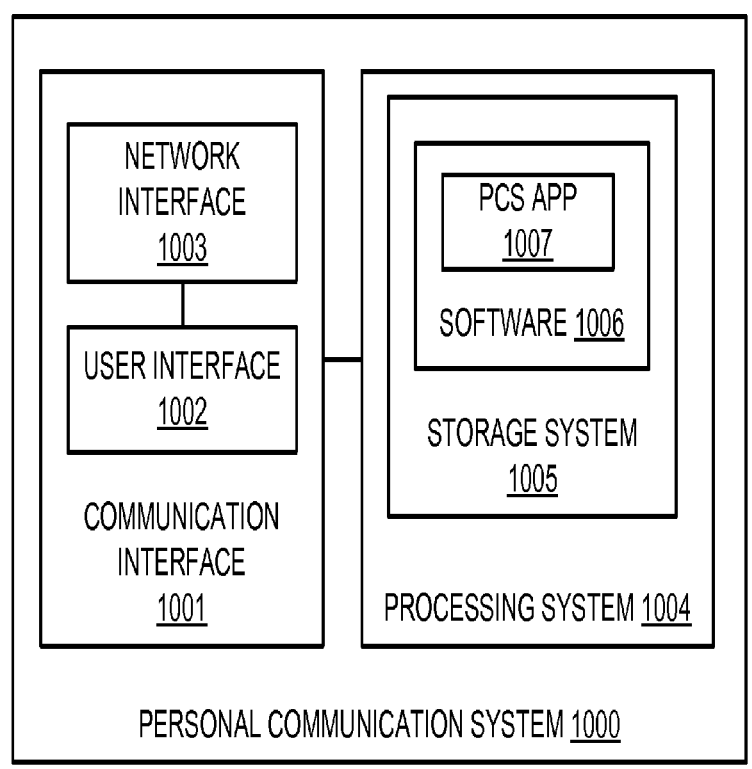
FIG. 10 illustrates a personal communication system.

FIG. 10 illustrates a personal communication system 1000. Personal communication system 1000 is an example of PCS 110, PCS 322, PCS 822, WCD 350, WCD 850, PC 360, and PC 860, although PCS 110, PCS 322, PCS 822, WCD 350, WCD 850, PC 360, and PC 860 may use alternative configurations. Personal communication system 1000 includes communication interface 1001 and processing system 1004. Processing system 1004 includes storage system 1005. Storage system 1005 stores operating software 1006. Operating software 1006 includes PCS application 1007.

Communication interface 1001 includes user interface 1002 and network interface 1003. Communication interface 1001 may be distributed among multiple communication devices. User interface 1002 comprises components that interact with a user. User interface 1002 may include a keyboard, display screen, mouse, touch pad, or some other user input/output apparatus. User interface 1002 may be omitted in some examples.

Network interface 1003 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

Processing system 1004 could comprise a computer microprocessor, logic circuit, or some other processing device. Processing system 1004 may be distributed among multiple processing devices. For example, the processor may reside on a third party server. In this case, in order to monitor the personal communication system for schedule factors relevant to the initial workforce schedule, the processor examines accessible areas of one or more users profiles on the third party server and/or the remote PCS for personal information that could be used to modify or change the initial workforce schedule.

Storage system 1005 could comprise a disk, tape, integrated circuit, server, or some other memory device. Storage system 1005 may be distributed among multiple memory devices.

In operation, processing system 1004 retrieves and executes software 1006 from storage system 1005. Software 1006 may comprise an operating system, utilities, drivers, networking software, and other software typically loaded onto a computer system. Software 1006 could comprise an application program, firmware, or some other form of machine-readable processing instructions. When executed by processing system 1004, software 1006 directs processing system 1004 to operate as described herein. In particular, when executed, PCS application 1007 creates and updates workforce schedules using the PCS 1000.

Figure 11:
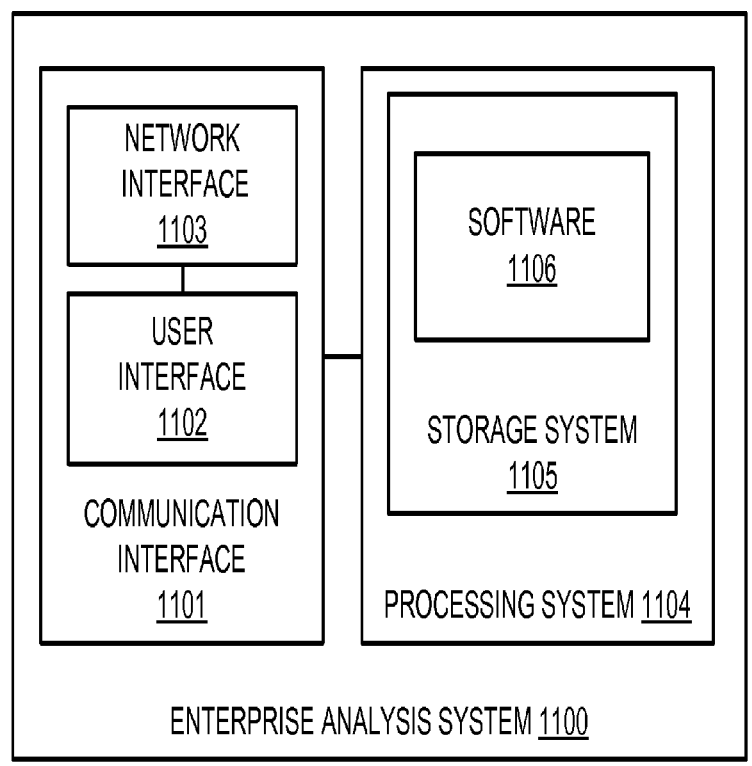
FIG. 11 illustrates an enterprise analysis system.

FIG. 11 provides a detailed block diagram of enterprise analysis system 1100 for creating and updating a schedule. Enterprise analysis system 1100 includes communication interface 1101 and processing system 1104. Interface 1101 includes system interface 1102 and communication interface 1103. Processing system 1104 includes storage system 1105. Storage system 1105 stores software 1106. Processing system 1104 is linked to interface 1101.

Enterprise analysis system 1100 could be comprised of a programmed general-purpose computer, although those skilled in the art will appreciate that programmable or special purpose circuitry and equipment may be used. Enterprise analysis system 1100 may be distributed among multiple devices that together comprise elements 1101-1106.

Network interface 1103 is configured to communicate personal schedule information with web service provider 320, PC 360 and WCD 350. Network interface 1103 could comprise a modem, port, transceiver, or some other communication device. Network interface 1103 may be distributed among multiple communication devices. Processing system 1104 could comprise a computer microprocessor, logic circuit, or some other processing device. Processing system 1104 may be distributed among multiple processing devices.

User interface 1102 may comprise a keyboard, mouse, voice recognition interface, microphone and speakers, graphical display, touch screen, or some other type of user device. User interface 1102 is configured to communicate with enterprise analysis system 312 and/or a system operator. User interface 1102 may contain a user interface and/or a TCP/IP interface. User interface 1102 may be distributed among multiple user devices.

Storage system 1105 could comprise a disk, tape, integrated circuit, server, or some other memory device. Storage system 1105 may be distributed among multiple memory devices.

Processing system 1104 retrieves and executes software 1106 from storage system 1105. Software 1106 may comprise an operating system, utilities, drivers, networking software, and other software typically loaded onto a computer system. Software 1106 could comprise an application program, firmware, or some other form of machine-readable processing instructions. When executed by processing system 1104, software 1106 directs processing system 1104 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for creating and updating workforce schedules, the method comprising:
    generating, through a personal communication system, a request for initial schedule information corresponding to an initial workforce schedule generated by an enterprise communication system;
    transmitting the request from the personal communication system across a communications network to the enterprise analysis system;
    receiving a response from the enterprise analysis system at the personal communication system, wherein the response includes the initial schedule information corresponding to the initial workforce schedule;
    establishing a proxy for the personal communication system at a remote processor connected to at least one third party web service provider to make at least one user profile on the at least one third-party servers available to the personal communication system, wherein the at least one user profile is configured to share information in the user profile with the personal communication system of a user;
    automatedly monitoring, with the personal communication system, the user profile of the user on the at least one third party web service provider by examining information in the user profile;
    based on the monitoring, identifying text in the user profile containing future personal schedule information relevant to the initial schedule;
    with the personal communication device, automatedly analyzing the future personal schedule information identified by the monitoring to determine schedule factors for the future personal schedule information, wherein the schedule factors include times when the user is unavailable based on the analysis of the text of the future personal schedule information;
    using the personal communication system, transmitting the schedule factors of the user across the communications network to the enterprise analysis system;
    generating, at the enterprise analysis system, an updated workforce schedule based on the initial workforce schedule and the received schedule factors of the user; and
    receiving at the personal communication system the updated workforce schedule from the enterprise analysis system and displaying an updated view of the updated workforce schedule.

2. The method of claim 1, the method further comprising connecting, across a communications network, the enterprise communication system and the personal communication system.

3. The method of claim 1, wherein the personal communication system is remote from the enterprise communication system.

4. The method of claim 1, wherein the enterprise communication system and the personal communication system have a standardized communication interface.

5. The method of claim 1, wherein the initial workforce schedule includes complied schedule information for a plurality of workers.

6. The method of claim 1, the method further comprising generating, on the personal communication system, a view of the initial workforce schedule based on the initial schedule information and displaying the view of the initial workforce schedule.

7. The method of claim 1, wherein the enterprise analysis system includes a workforce management system, a workforce optimization system, a learning system, a human resources system, and a calendar management system.

8. A system for creating and updating schedules, the system comprising:
    a personal computing device;
    an enterprise communication system;
    at least one remote third party web service provider;
    a communications network connecting the personal computing device and enterprise communication system;
    a first processor of first hardware on the personal computing device that executes first software configured within an operating system of the personal computing device to:
        generate a request for initial schedule information corresponding to an initial workforce schedule generated by the enterprise communication system,
        transmit the request across the communications network to the enterprise analysis system,
        receive a response from the enterprise analysis system, wherein the response includes the initial schedule information corresponding to the initial workforce schedule,
        establish a proxy at a remote processor connected to the at least one remote third party web service provider to make at least one user profile on the at least one third party server available to the personal communication system, wherein the at least one user profile is configured to share information in the user profile with the personal communication system of a user,
        monitor, automatedly, the user profile of the user on the at least one third party web service provide by examining information in the user profile,
        based on the monitoring, identify text in the user profile containing future personal schedule information relevant to the initial schedule,
        analyze, automatedly, the future personal schedule information identified by the monitoring to determine schedule factors for the figure personal schedule information, wherein the schedule factors include times when the user is unavailable based on the analysis of the text of the future personal schedule information,
        transmit the schedule factors of the user across the communications network to the enterprise analysis system, and
        receive the updated workforce schedule from the enterprise analysis system and display an updated view of the updated workforce schedule; and
    a second processor of second hardware executing second software on the enterprise communication system that executes second software configured within an operating system of the enterprise communication system to:
        generate the initial workforce schedule based on the received request from the personal computing device, and
        generate an updated workforce schedule based on the initial workforce schedule and the received schedule factors of the user transmitted by the personal communication device.

9. The system of claim 8, wherein the personal communication system is remote from the enterprise communication system.

10. The system of claim 8, wherein the enterprise communication system and the personal communication system have a standardized communication interface.

11. The system of claim 8, wherein the initial workforce schedule includes complied schedule information for a plurality of workers.

12. The system of claim 8, wherein the first processor is further configured to generate a view of the initial workforce schedule based on the initial schedule information.

13. The system of claim 12, wherein the first processor is further configured to display the view of the initial workforce schedule.

14. The system of claim 8, wherein the enterprise analysis system includes a workforce management system, a workforce optimization system, a learning system, a human resources system, and a calendar management system.

15. A non-transitory computer readable medium having program instructions stored thereon and in conjunction with an operating system for creating and updating schedules that, when executed by a personal computing device having first hardware and first software, directs the personal computing device to:
- establish a proxy for the personal computing device at a remote processor connected to at least one third party web service provider to make at least one user profile on the at least one their party web service provider available to the personal computing device, wherein the at least one user profile is configured to share information in the user profile with the personal computing device of a user;
- use the program instructions to generate a request for initial schedule information corresponding to an initial workforce schedule generated by an enterprise analysis system having second hardware and second software within the enterprise communication system;
- transmit the request for initial schedule information to the enterprise analysis system;
- receive at the personal computing device a response from the enterprise analysis system, wherein the response includes the initial schedule information corresponding to the initial workforce schedule;
- automatedly monitor, with the personal communication system, the user profile of the user on the at least one third party web service provider by examining the information in the user profile;
- based on the monitoring, identify text in the user profile containing future personal schedule information relevant to the initial schedule;
- with the personal communication device, analyze the future personal schedule information identified by the monitoring to determine schedule factors for the future personal schedule information, wherein the schedule factors includes times when the user is unavailable based on the analysis of the text of the future personal schedule information;
- transmit the schedule factors of the user to the enterprise analysis system for use by the enterprise analysis system to generate an updated schedule; and
- generate an updated schedule by the personal communication system based on the initial workforce schedule and the transmitted schedule factors of the user.

16. The non-transitory computer readable medium of claim 15, wherein the personal computing device is further directed to connect, across a communications network the persona computing device, the enterprise communication system, and the at least one third party web service provider.

17. The non-transitory computer readable medium of claim 16, wherein the personal computing device, the enterprise communication system and the at least one third party web service providers have respective and separate links to the communications network.

18. The non-transitory computer readable medium of claim 16, wherein the separate links comprise a standardized interface for communications across the communications network.

19. The non-transitory computer readable medium of claim 15, wherein the personal computing device is further directed to generate with the program instructions a view of the initial workforce schedule based on the initial schedule information.

20. The non-transitory computer readable medium of claim 19, wherein the personal computing device is further directed to display the view of the initial workforce schedule on the personal computing device.

\* \* \* \* \*